United States Patent [19]
Beck et al.

[11] 3,897,440
[45] July 29, 1975

[54] 2-CYANO-3-NITRO-5-TRIFLUOROMETHYL PHENYL THIO PYRIDINES

[75] Inventors: James R. Beck, Indianapolis; Robert G. Suhr, Greenfield, both of Ind.

[73] Assignee: Eli Lilly and Company, Indianapolis, Ind.

[22] Filed: Nov. 23, 1973

[21] Appl. No.: 418,511

[52] U.S. Cl. ............... 260/294.8 G; 71/92; 71/94; 260/251 R; 260/254; 260/309; 260/308 R; 260/308 D; 260/309.2; 424/251; 424/253; 424/263; 424/269; 424/273
[51] Int. Cl. ............................................ C07d 31/50
[58] Field of Search ............................ 260/294.8 G

[56] References Cited
FOREIGN PATENTS OR APPLICATIONS
268,212   2/1964   Australia..................... 260/294.8 G

*Primary Examiner*—Norma S. Milestone
*Assistant Examiner*—Robert W. Ramsuer
*Attorney, Agent, or Firm*—Dwight E. Morrison; Everet F. Smith

[57] ABSTRACT

There are disclosed novel $\alpha,\alpha,\alpha$-trifluoro-2-nitro-6-(substituted-mercapto)-p-tolunitriles prepared from $\alpha,\alpha,\alpha$-trifluoro-2,6-dinitro-p-tolunitrile by a nitro displacement reaction. The novel compounds possess herbicidal, bactericidal, fungicidal and antiprotozoal properties.

4 Claims, No Drawings

2-CYANO-3-NITRO-5-TRIFLUOROMETHYL PHENYL THIO PYRIDINES

BACKGROUND OF THE INVENTION

1. Field of the Invention

This invention relates to α,α,α-trifluoro-2-nitro-6-(substituted-mercapto)-p-tolunitriles prepared from α,α,α-trifluoro-2,6-dinitro-p-tolunitrile. The preparation is carried out by displacement of a nitro group by a nucleophile under basic conditions. The nucleophiles used in the present instances are thiol anions.

2. Description of the Prior Art

In the prior art, the nucleophilic lability of activated nitro groups has been described by Bunnett et al., *J. Am. Chem. Soc.*, 79, 385 (1957), and by Bolto et al., *Australian J. Chem.*, 9, 74 (1956).

There are numerous examples in the chemical literature of activated nitro displacements in substituted benzenes, although most cases involve intramolecular displacement. See for example, T. W. M. Spence and G. Tennant, *J. Chem. Soc., Perkin Trans.*, 1, 835 (1972).

An example of an intermolecular displacement is provided by the synthesis of 2,6-dimethoxybenzonitrile from m-dinitrobenzene, as reported by A. Russell et al., "Organic Syntheses," Coll. Vol. III, p. 293 (John Wiley and Sons, Inc., New York, N.Y., 1955). The preparation is accomplished in two steps. First, the m-dinitrobenzene is dissolved in methanol and allowed to react with potassium cyanide. In the second step, the 2-nitro-6-methoxybenzonitrile obtained in the first step is refluxed with a solution of potassium hydroxide in methanol to yield 2,6-dimethoxybenzonitrile in 15–17 percent overall yield. No utility is disclosed for the compound.

SUMMARY OF THE INVENTION

This invention relates to novel α,α,α-trifluoro-2-nitro-6-(substituted-mercapto)-p-tolunitriles prepared from α,α,α-trifluoro-2,6-dinitro-p-tolunitrile by a nitro displacement reaction. The novel compounds so produced are active variously as herbicides, bactericides, antifungal and antiprotozoal agents.

DESCRIPTION OF THE PREFERRED EMBODIMENT

The novel compounds of this invention are of a class having the formula

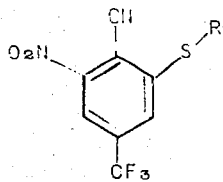

wherein
R is 2-pyridyl, 2-pyridyl-N-oxide, 4-pyridyl, 2-pyrimidyl, 1-methylimidazol-2-yl, 1H-1,2,4-triazol-3-yl, 1-phenyl-1H-tetrazol-5-yl, 2-benzimidazolyl, or purin-8-yl.

The novel compounds coming within the scope of the generic formula, supra, variously possess activity as bactericidal, antifungal, antiprotozoal, and pre- and post-emergence herbicidal agents.

Thus, the novel compounds have shown in vitro antifungal activity at rates of about 10 to 100 mcg./ml. against *Botrytis cinerea*, the causative organism of grey mold. A number of the compounds have also shown in vitro antifungal activity at rates of about 100 mcg./ml. against *Verticillium albo-atrum*, the causative organism of verticillium wilt, and against *Trichophyton mentagrophytes*, the causative organism of athletes foot.

The novel compounds have shown in vitro antiprotozoal activity against *Ochromonas malhamensis*, *Trichomonas vaginalis*, *Euglena gracillus*, *Tetrahymena pyriformis*, and *Chlorella vulgaris*, in a plate test at 40 mcg. per 6.25 mm. disc.

In addition, the compounds have shown in vitro antibacterial activity against *Erwinia amylovora*, the causative organism of apple and pear fire blight, at rates of about 10 to 100 mcg. per ml., and against *Staphylococcus aureus* 3055 at rates of about 10 to 100 mcg. per ml.

Further, α,α,α-trifluoro-2-nitro-6-(4-pyridylthio)-p-tolunitrile, α,α,α-trifluoro-2-nitro-6-(2-pyridylthio)-p-tolunitrile, and 2-(2-benzimidazolylthio)-α,α,α-trifluoro-6-nitro-p-tolunitrile all have shown postemergent herbicidal activity at an application rate of 8 pounds per acre.

Another of the compounds, namely, α,α,α-trifluoro-2-nitro-6-(2-pyrimidylthio)-p-tolunitrile has shown pre-emergent herbicidal activity at an application rate of 8 pounds per acre.

The novel compounds are prepared by allowing α,α,α-trifluoro-2,6-dinitro-p-tolunitrile to react with an excess of a thiol in the presence of a suitable base in a suitable solvent at a reaction temperature within the range of from about 0° to about 100°C. The thiols which can be used in the preparation of the novel compounds include 2-mercaptopyridine, 3-mercaptopyridine, 4-mercaptopyridine, pyridine N-oxide 2-thiol, 2-mercapto-1-methylimidazole, 2-mercaptopyrimidine, 3-mercapto-1,2,4-triazole, 8-mercaptopurine, 1-phenyl-1H-tetrazole-5-thiol, 2-mercaptobenzimidazole, and the like. Suitable bases include sodium hydroxide, potassium hydroxide, and the like. Suitable solvents include methanol, dimethylformamide, aqueous dimethylformamide, a mixture of methanol and dimethylformamide and the like. The reaction time can vary from a period of about an hour to about 5 or 6 hours.

The α,α,α-trifluoro-2,6-dinitro-p-tolunitrile used in the synthesis of the novel compounds is prepared according to the procedure set forth by Beck, *J. Org. Chem.* 37, 3224 at 3226 (1972).

In general, the preparation of the novel compounds is carried out by suspending or dissolving α,α,α-trifluoro-2,6-dinitro-p-tolunitrile in a suitable solvent, for example, dimethylformamide, together with a base, for example, potassium hydroxide, and a thiol, for example, 2-mercaptopyridine. The resulting mixture is stirred at ambient room temperature for a time sufficient to allow substantial completion of the displacement reaction, usually from about 1 to about 6 hours, preferably about three hours. The reaction product mixture is worked up by pouring it into a mixture of ice and water, with stirring. The solid which precipitates is filtered off and purified by recrystallization from a suitable solvent, for example, a mixture of ethanol and acetonitrile. The product is identified by elemental analyses and NMR spectrum. With the instant reactants, the product is α,α,α-trifluoro-2-nitro-6-(2-pyridylthio)-p-tolunitrile.

That the invention may be more clearly understood, the following examples, illustrative of the preparation of the novel compounds, are presented. However, the examples are not to be construed as thereby limiting the scope of the invention.

EXAMPLE 1

α,α,α-Trifluoro-2-nitro-6-(2-pyridylthio)-p-tolunitrile

A mixture of 2.3 g. of 2-mercaptopyridine, 5.22 g. of α,α,α-trifluoro-2,6-dinitro-p-tolunitrile, and 1.4 g. of potassium hydroxide, in 100 ml. of dimethylformamide, was stirred at about ambient room temperature for about three hours. The reaction product mixture was poured into a mixture of ice and water. The solid material which precipitated was filtered off and the filtrate discarded. The solid material was recrystallized from a mixture of acetonitrile and commercial 95% ethanol to yield a crystalline product having a melting point of about 76°–78°C., and weighing about 4.4 g. The product was identified by elemental analyses and NMR spectrum as α,α,α-trifluoro-2-nitro-6-(2-pyridylthio)-p-tolunitrile.

Following the same general procedure and using appropriate starting materials, the following additional compounds were prepared:

2-[(6-Cyano-α,α,α-trifluoro-5-nitro-m-tolyl)thio]-pyridine-N-oxide, having a melting point of about 156°–158°C., identified by elemental analyses and NMR spectrum.

α,α,α-Trifluoro-2-nitro-6-(4-pyridylthio)-p-tolunitrile, having a melting point of about 176°–178°C., identified by elemental analyses and NMR spectrum.

α,α,α-Trifluoro-2-[(1-methylimidazol-2-yl)thio]-6-nitro-p-tolunitrile, having a melting point of about 182°–185°C., identified by elemental analyses and NMR spectrum.

α,α,α-Trifluoro-2-nitro-6-(2-pyrimidylthio)-p-tolunitrile, having a melting point of about 91°–93°C., identified by elemental analyses and NMR spectrum.

α,α,α-Trifluoro-2-nitro-6-(1H-1,2,4-triazol-3-ylthio)-p-tolunitrile, having a melting point of about 156°–159°C., identified by elemental analyses and NMR spectrum.

α,α,α-Trifluoro-2-nitro-6-[(1-phenyl-1H-tetrazol-5-yl)thio]-p-tolunitrile, having a melting point of about 172°–174°C., identified by elemental analyses and NMR spectrum.

α,α,α-Trifluoro-2-nitro-6-(purin-8-ylthio)-p-tolunitrile, having a melting point of about 155°–158°C., identified by elemental analyses and NMR spectrum.

The novel compounds described hereinabove can be used in a variety of ways. Thus, in view of their antibacterial properties, they can be used in disinfecting solutions for wasing down the walls, laboratory benches, and equipment of rooms where sterility and more than ordinary cleanliness is required. In addition, the compounds formulated as sprays, dusts, or powders, with suitable solvents, dispersants, wetting agents, extenders, and the like, can be utilized to protect apple and pear trees from fire blight.

Those compounds possessing herbicidal properties can be used to control undesirable vegetation, as in parking lots, driveways, along railroad tracks, and the like.

We claim:

1. A compound of the formula

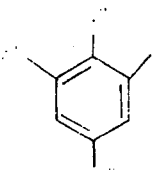

wherein

R is 2-pyridyl, 2-pyridyl-N-oxide, 4-pyridyl.

2. A compound as in claim 1, said compound being α,α,α-trifluoro-2-nitro-6-(2-pyridylthio)-p-tolunitrile.

3. A compound as in claim 1, said compound being 2-[(6-cyano-α,α,α-trifluoro-5-nitro-m-tolyl)thio]pyridine-N-oxide.

4. A compound as in claim 1, said compound being α,α,α-trifluoro-2-nitro-6-(4-pyridylthio)-p-tolunitrile.

* * * * *

UNITED STATES PATENT AND TRADEMARK OFFICE
CERTIFICATE OF CORRECTION

PATENT NO. : 3,897,440
DATED : July 29, 1975
INVENTOR(S) : James R. Beck
Robert G. Suhr It is certified that error appears in the above-identified patent and that said Letters Patent are hereby corrected as shown below:

Column 1, line 21, should read as follows:

G. Tennant, <u>J. Chem. Soc., Perkin Trans.</u>, 1, 835 (1972).

Column 4, line 13, "wasing" should read --washing--.

Column 4, drawing at lines 26-35 should read as follows:

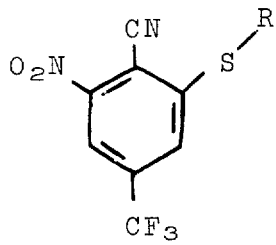

Signed and Sealed this eighteenth Day of November 1975

[SEAL]

Attest:

RUTH C. MASON
Attesting Officer

C. MARSHALL DANN
Commissioner of Patents and Trademarks